Patented Dec. 17, 1935

2,024,525

UNITED STATES PATENT OFFICE 2,024,525

DIOXAZINE COMPOUNDS AND PROCESS OF MAKING SAME

Georg Kalischer, Frankfort-on-the-Main, and Werner Zerweck, Frankfort-on-the-Main-Fechenheim, Germany, assignors to General Aniline Works, Inc., New York, N. Y., a corporation of Delaware No Drawing. Original application July 11, 1933, Serial No. 679,984. Divided and this application May 26, 1934, Serial No. 727,834. In Germany July 16, 1932

5 Claims. (Cl. 260—28)

The present application is a division of our application Serial No. 679,984, filed July 11, 1933, and relating to a process for producing new condensation products of the oxazine series.

Our invention relates to new dioxazine compounds of the general formula

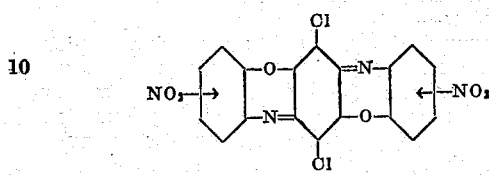

in which both external nuclei may contain further monovalent substituents and a process of making the said products.

As is well known, quinone and particularly halogenated quinones condense with o-aminoaryl-mercaptans with the formation of dyestuffs of the thiazine series. The condensation of chloranil and one molecular proportion of 2-amino-3-methyl-5-phenyl-amino-thiophenol, for example, takes place according to the following equation:—

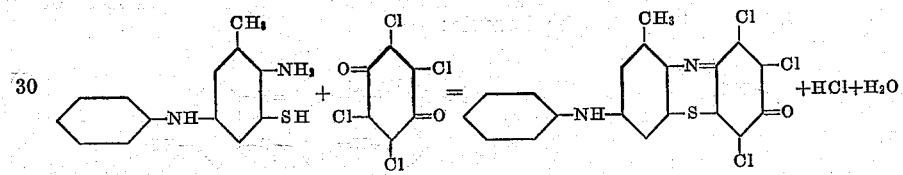

(cf. U. S. Patent 1,588,384).

It is impossible to apply this condensation reaction to o-aminophenols and their alkyl-derivatives, since the corresponding oxazine compounds are not formed but rather the quinone in this case only has an oxidizing effect.

In accordance with the present invention in contradistinction to this latter fact o-aminophenols of the benzene or naphthalene series containing a nitro-group in the molecule are capable of the above condensation reaction with quinones and halogenated quinones of the benzene or naphthalene series with the formation of new condensation products of the oxazine series. 1,4-quinones, which may be substituted by halogen in the 2- and 5-position, are capable of reacting with one or also with two molecular proportions of nitro-o-aminophenols. For example the condensation of chloranil with one and two molecular proportions respectively of 5-nitro-2-aminophenol yields the following compounds

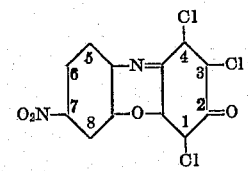

and

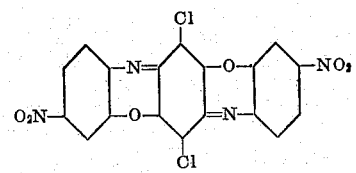

respectively.

The nitro-oxazines thus obtainable in a very good yield are intensely colored compounds which may be used as pigment dyestuffs; in part they are important intermediates for the production of further conversion products.

If the nitroaminophenol compound used as the one reaction component contains a further acid substituent such as a sulfonic acid or a further nitro-group the condensation reaction probably runs in such a way that in the first phase one molecular proportion of the quinone reacts with two molecular proportions of a component of such kind with the formation of a diarylidoquinone compound which is decomposed in the second phase while splitting off two molecules of water with the formation of a triphen-dioxazine compound.

In order to further illustrate our invention the following examples are given, the parts being by weight and all temperatures in centigrade degrees; but we wish it, however, to be understood that our invention is not limited to the particular products nor reaction conditions given therein:—

*Example 1*

A mixture of 24,8 parts of chloranil, 34 parts of 5-nitro-2-amino-phenol, 25 parts of anhydrous sodium acetate and about 250 parts of alcohol is boiled for some hours in an apparatus provided with a reflux condenser, the reaction product is filtered off while warm, washed out with alcohol and water and dried. When recrystallized from nitrobenzene the new condensation product represents bright violet-red crystals of a metallic lustre which dissolve in concentrated sulfuric acid with a brilliant green-blue color. The compound corresponds probably to the following formula:

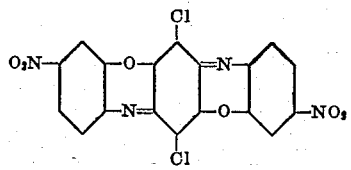

i. e. a dichloro-dinitro-triphen-dioxazine.

*Example 2*

A mixture of 24,8 parts of chloranil, 67 parts of 4-nitro-2-aminophenol-6-sulfonic acid of 72% strength, 50 parts of anhydrous sodium acetate, about 300 parts of alcohol and about 25 parts of water is boiled for some hours in an apparatus provided with a reflux condenser. The precipitate is filtered off by suction, washed with alcohol and dried. This intermediate compound dyes wool from an acid bath brown shades and dissolves in concentrated sulfuric acid with a dull red color, turning after a short time to blue. When pouring this blue solution into water and adding sodium chloride thereto, a dioxazine-dyestuff is obtained which dyes cotton from an acid bath brown-orange shades and dissolves in concentrated sulfuric acid with a bright blue color. The product corresponds probably with the formula:

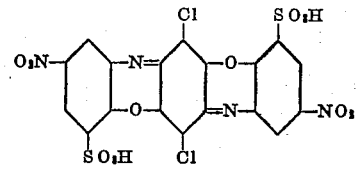

*Example 3*

A mixture of 24.8 parts of chloranil, 44,2 parts of the sodium salt of 2-amino-4,6-dinitrophenol, 30 parts of sodium acetate and about 200 parts of alcohol of about 90% strength is boiled for about 5 hours in an apparatus provided with a reflux condenser. The formed condensation product which corresponds probably with the formula:

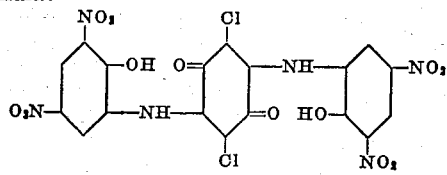

or

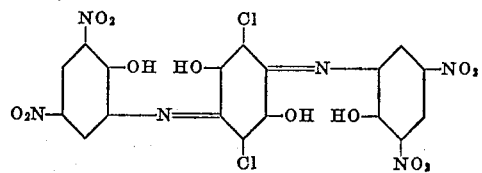

is after cooling down filtered off, washed out with alcohol and water and dried. It crystallizes from nitrobenzene as reddish brown needles melting above 300°. It dissolves in concentrated sulfuric acid with a reddish brown color.

1 part of this intermediate is poured into 10 parts of concentrated sulfuric acid. After a short time the coloration of the solution turns from reddish brown to violet blue. The reaction mass is poured on ice. The formed dichloro-tetra-nitro-triphen-dioxazine of the probable formula:

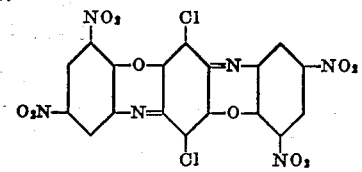

is filtered off, washed out and dried. From nitrobenzene it crystallizes as bluish red needles melting above 300°. It dissolves in concentrated sulfuric acid with a pure violet-blue color.

We claim:—

1. A process for producing dioxazines which comprises acting with two molecular proportions of a nitro-ortho-aminophenol of the benzene or naphthalene series on one molecular proportion of a halogenated quinone of the benzene or naphthalene series.

2. Dioxazine compounds corresponding to the general formula

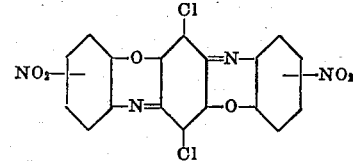

in which both external nuclei may contain sulfonic acid groups as further monovalent substituents which products are intensely colored.

3. The dichloro-dinitro-triphen-dioxazine of the formula:

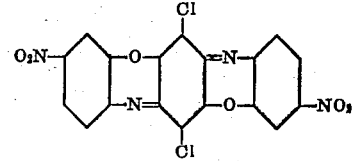

which represents when recrystallized from nitrobenzene bright violet-red crystals of a metallic lustre which dissolve in concentrated sulfuric acid with a brilliant green-blue color.

4. The dichloro-dinitro-triphen-dioxazine-disulfonic acid of the formula:

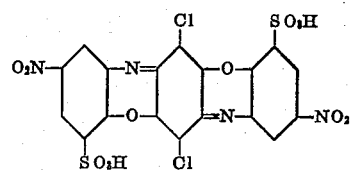

which dissolves in concentrated sulfuric acid with a bright blue color and dyes cotton from an acid bath brown-orange shades.
5. The dichloro-tetra-nitro-triphen-dioxazine of the formula
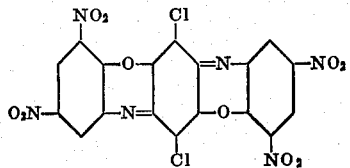
which dissolves in concentrated sulfuric acid with a pure violet-blue color and crystallizes from nitrobenzene as bluish red needles melting above 300° C.
GEORG KALISCHER.
WERNER ZERWECK.